H. Jenkins,

Screen.

No 747. Reissued June 28, 1859.

Witnesses:
Samuel H. Sewell
Chas H. Smith

Inventor:
Henry Jenkins

UNITED STATES PATENT OFFICE.

HENRY JENKINS, OF BROOKLYN, NEW YORK.

IMPROVEMENT IN THE PROCESS OF MANUFACTURING WIRE GRATINGS, &c.

Specification forming part of Letters Patent No. 5,006, dated March 6, 1847; Reissue No. 747, dated June 28, 1859.

*To all whom it may concern:*

Be it known that I, HENRY JENKINS, of Brooklyn, in the county of Kings and State of New York, late of Pottsville, in the county of Schuylkill and State of Pennsylvania, have invented a new and useful Improvement in Manufacturing Metal Bars or Wires into Screens and other Articles; and I do hereby declare that the following is a full and exact description thereof.

The screens or sieves and other articles which I manufacture, requiring intersecting bars of great strength and with large meshes, have their meshes formed entirely of wrought-iron or other metal, and are in consequence thereof, and of the particular manner in which they are made, more permanent and durable than any of the screens or intersecting iron-work heretofore constructed.

The screens for the sifting of substances that are of a large size—like broken coal—have heretofore been made in various ways, but to construct them so that the meshes should retain their size when acted upon by an article that is hard or weighty has been a task of much difficulty and great expense. Attempts have been made before to construct them of woven wire, but it has failed entirely, as the woof or filling will not yield to the action of the warp, but will remain nearly straight in consequence of its being necessary to use the wire of the larger sizes. The meshes thus produced are immediately rendered irregular when brought into use.

My improvement in this manufacture consists in the preparing of the wire which is to constitute what may be called the woof or filling by crinkling it preparatory to its being used in the process of weaving or putting it together, and sometimes, also, as will presently appear, in crinkling that also which may be denominated the "warp." This crinkling consists in bending it in such a manner and to the same extent in which it would be desired to bend it by the action of the loom were it possible so to do. The respective bends on the wire must of course be made at such distances apart as shall correspond with the size or shape of the meshes; but when these are to be of the larger size I prefer to make the bends or crinkles three times as numerous as the meshes, as the length of the wire between each bend would otherwise be objectionable. This will appear more fully by reference to the accompanying drawings.

Figure 1:
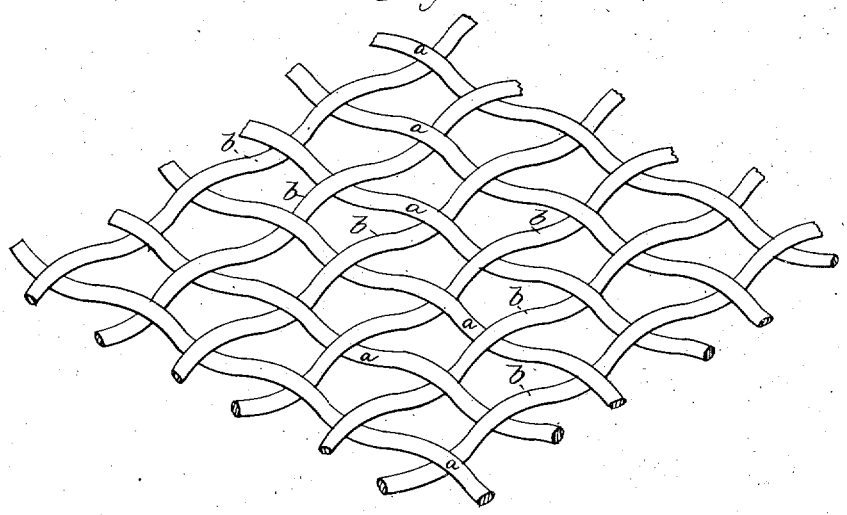
Figure 2:
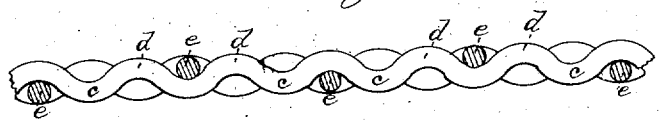

In the drawings, Figure 1 is a perspective representation of a portion of one of my screens, in which the wires *a a* may be considered as the warp-wires, and those *b b* as the weft or filling, or vice versa, there not being any apparent difference in them in the manufactured article. Fig. 2 shows a crinkled wire, seen laterally, as it makes a part of the screen. In this figure the wire is so drawn as to show the manner in which I prefer to crinkle it when the meshes are to be of either of the larger sizes. It will be seen that under this arrangement there are two crinkles or bends, *c* and *d*, between every crossing wire *e e*. This is so made for the purpose of keeping the extremities of the crinkles or bends within the general plane of the screen. When so made, I crinkle the woof or longer wires in the same manner with the cross-wires or filling, and that for the same reason.

Machines for bending or crinkling the wires and for weaving the wires so crimpled have been invented and patented by me, but this crinkling or bending, and also the weaving or otherwise interlocking, may be effected in many other modes than by the application of said machinery, as will be manifest to every competent machinist. The real merit of my invention consists, therefore, in the nature of the improved article as manufactured by me independently of the many ways in which the wires may be crinkled and interwoven.

What I claim as my invention, and desire to secure by Letters Patent, is—

Manufacturing screens or other articles from metallic wires or bars that are bent or crinkled at the point of intersection previously to being laid or woven up, whereby I am enabled to form meshes of any desired size or shape by such intersecting bars or wires, so that they shall be rigid and durable, as set forth, and this I claim irrespective of the mechanism for bending or crinkling said wires or interweaving them to form the requisite meshes.

In witness whereof I have hereunto set my signature this 21st day of May, 1859.

HENRY JENKINS.

Witnesses:
LEMUEL W. SERRELL,
CHAS. H. SMITH.